United States Patent [19]
Dorr et al.

[11] 3,788,043
[45] Jan. 29, 1974

[54] ABSORBER FOR SULFUR TRIOXIDE

[75] Inventors: Karl-Heinz Dorr, Mainz; Hugo Grimm, Frankfurt am Main; Rolf Kola, Homberg, all of Germany

[73] Assignee: Metallgesellschaft Aktiengesellschaft, Frankfurt am Main, Germany

[22] Filed: Oct. 12, 1971

[21] Appl. No.: 188,128

[30] Foreign Application Priority Data
Oct. 15, 1970  Germany.................. P 20 50 579.7

[52] U.S. Cl.......................... 55/237, 23/284, 55/73, 55/259, 261/79 A, 423/522
[51] Int. Cl.............................................. B01d 47/06
[58] Field of Search..... 55/93, 94, 95, 73, 237, 240, 55/241, 259; 261/79 A, 116, DIG. 54; 423/532, 522, 242; 23/284

[56] References Cited
UNITED STATES PATENTS

| | | | |
|---|---|---|---|
| 3,409,409 | 11/1968 | Sackett | 55/259 |
| 3,427,006 | 2/1969 | Oiestad | 261/DIG. 54 |
| 3,456,928 | 7/1969 | Selway | 261/DIG. 54 |
| 3,593,497 | 7/1971 | Grim et al. | 261/116 |
| 3,631,656 | 1/1972 | Haasberg et al. | 261/117 |
| 2,604,185 | 7/1952 | Johnstone et al. | 55/237 |

*Primary Examiner*—Bernard Nozick
*Attorney, Agent, or Firm*—Karl F. Ross

[57] ABSTRACT

In a contact process for transforming sulfur dioxide to sulfur trioxide, between the contact stages there is provided an interstage absorber for removing sulfur trioxide for the gases emerging from a previous stage. The gases are passed by a venturi system in intimate contact with sulfuric acid into a settling chamber in which sulfuric acid is collected in the sump and then, by another gas/liquid contactor or reagitator, into a further settling chamber with an outlet at its upper end.

3 Claims, 2 Drawing Figures

PATENTED JAN 29 1974   3,788,043

Karl-Heinz Dörr
Hugo Grimm
Rolf Kola
Inventors.

Karl F. Ross
Attorney

ABSORBER FOR SULFUR TRIOXIDE

FIELD OF THE INVENTION

Our present invention relates to an interstage absorber between contact oxidation stages of a plant for converting sulfur dioxide to sulfur trioxide and to a method of operating such an absorber. More particularly, the present invention concerns an interstage absorber for removing sulfur trioxide from the gases of a sulfuric acid plant between sulfur-trioxide-production stages.

BACKGROUND OF THE INVENTION

In the production of sulfuric acid, sulfur dioxide ($SO_2$) can be converted to sulfur trioxide ($SO_3$) by contact catalysis in a number of stages. Between such contact-catalysis of sulfur-trioxide-production stages, it has been proposed to provide interstage absorbers for sulfur trioxide to shift the mass-action relationship in favor of the production of further quantities of sulfur trioxide in subsequent stages. As a result of such interstage absorption, the conversion of sulfur dioxide to sulfur trioxide in the succeeding stage is improved. Because the interstage absorption of sulfur trioxide from the gases emerging from a contact catalysis step interposes an additional procedure in the flow pattern of the gases, it is desirable that the interstage absorption be carried out with maximum economy in a simple and convenient manner.

For example, the economic operation of an interstage absorber requires that the loss of heat in this operation be held to a minimum, that the temperature of the acid in the interstage absorber be relatively high so that less heat is transferred from the gas phase to the liquid phase, and that the gas velocity be high and the pressure drop low. The use of hot acid and the requirement for a small pressure drop complicates the design of an interstage absorber because the latter must be resistant to acid attack at high temperatures and dimension to minimize the aforementioned pressure drop.

In prior-art systems, interstage absorption generally uses a device similar to the final absorber. This has the inherent disadvantage that the final absorber is designed for maximum removal of sulfur trioxide from the gases at the expense of efficiency, whereas interstage absorption does not need such total removal. In other words, it is not essential that all of the sulfur trioxide of a preceding stage be removed in the interstage absorber before the gases are again subjected to contact catalysis, a slight proportion of residual sulfur trioxide having little effect upon the subsequent contact catalysis.

Among the conventional interstage absorbers or final absorbers usable also as interstage absorbers in accordance with conventional practices, are absorption towers with packing or baffles and which must be of considerably height. These systems require high capital expenditure, are voluminous and are of heavy weight. Furthermore, the acid must be pumped to considerable heights before being allowed to trickle downwardly and the upward gas-flow rate must be controlled so as to avoid obstructing the downwardly trickling liquid phase.

Conventional foam absorbers must have a large number of stages in cascade if sufficient absorption is to be obtained. Here also, the height of the unit is considerable and often prohibitive.

It has also been proposed heretofore to provide so-called venturi absorbers, generally comprising a plurality of venturi chambers in series, the liquid phase and the gas phase being separated downstream from each venturi. A venturi absorber is a venturi-type restriction through which the flow of one fluid induces the flow of the other, the fluids being intimately contacted with one another. As a result, the liquid phase absorbs sulfur trioxide from the gas phase and is separated from the latter in the enlarged cross-section chamber downstream from the venturi. A venturi cascade, however, is not satisfactory for interstage absorption because of the equipment cost and high heat loss which is characteristic of a series connection of venturi absorbers.

OBJECTS OF THE INVENTION

It is the principal object of the present invention to provide an improved interstage absorber for the purpose described which is capable of avoiding the disadvantages of conventional systems.

Another object of this invention is to provide an interstage absorber between contact-catalysis stages for the conversion of sulfur dioxide to sulfur trioxide, which is characterized by low heat losses and overall pressure drop, low capital expenditure and high efficiency.

It is still another object of the invention to provide an improved method of operating such an interstage absorber with low operating cost.

It is also an object of the invention to provide an interstage absorber in a sulfuric acid plant which can be operated with low pressure drops and energy requirements, low heat loss, high throughput, low operating and capital expenditure and which occupies a small area.

SUMMARY OF THE INVENTION

These objects and others which will become apparent hereinafter are attained, in accordance with the present invention, with an interstage absorber for removing sulfur trioxide from the gaseous effluent of a contact-catalyst stage in which sulfur dioxide is transformed into sulfur trioxide, the absorber comprising a downwardly opening upright venturi absorber for intimately contacting the gas mixture of sulfuric acid (liquid phase), a sulfuric-acid or liquid-phase sump below the absorber, and a reagitator or discharge device laterally of the venturi absorber for accelerating the intimate contact betwwen the gas phase and the liquid phase entrained thereby. Ahead of, or downstream of the intimate contactor formed by the "reagitator" turbulencing device is a conventional settling chamber for precipitating sulfuric acid particles and provided with a sump for the latter. Above this second sump is an outlet for the gas phase, now substantially free from sulfur trioxide. While we may use the term reagitator hereinafter to designate the means between the flow system formed by the venturi absorber and the first sump and the settling chamber constituted by the second sump and the outlet from the interstage absorber, it should be understood that this means is a device for promoting intimate contact between the entrained liquid and gas phase. Hence it may be a system provided with blades, vanes or the like which are movable or stationary and which may operate with or without baffles, or an aperture of constriction in which the gas and entrained droplets are accelerated ; the tendency toward turbulence in the fluid mixture is increased as is the effectiveness of the stripping of the sulfur trioxide from the gas by the liquid.

A major portion of the sulfur trioxide of the gas mixture introduced into the interstage absorber is removed by absorption or dissolution in the relatively small amount of acid contact with the gas in the upright venturi absorber. Since considerable heat per unit weight or volume of the sulfuric acid is transferred to the latter, the sulfuric acid is strongly heated and the gas leaving the venturi absorber has a correspondingly high temperature in the region of 100° to 180°C.

According to the principles of this invention, the reagitator may comprise a lateral passage opening below the venturi absorber and the above the first or venturi sump, the passage being provided with a swirling or velocity increasing means. A suitable swirling device may be constituted by guide vanes formed along the passage, or by constructing the passage so that it opens generally tangentially into the settling chamber. As a result a cyclone-type or vortex movement, about the vertical axis of the settling chamber, is imparted to the gas-liquid mixture traversing the passage. When, in addition, or independently, it is desirable to increase the velocity of the gas-liquid mixture, the passage may be provided with an orifice plate. The turbulencing means or reagitator preferably defines a venturi passage or constriction which has been found to be highly effective in promoting contact between the gas and liquid phases of the mixture traversing the passage.

In the reagitator passage, sulfuric acid entrained by the gas is in a $SO_3$-transfer equilibrium with the gas phase so that there is some transfer to sulfuric trioxide from the acid to the gas and some reabsorption of sulfur trioxide from the gas into the liquid. The net result is an increase in the sulfur trioxide concentration of the liquid entrained in the gas since additional cold acid is not supplied during this portion of the process, or substantial cooling of the gases occurs. We may, however, provide means for supplying acid at the reagitator, in which case, we prefer to heat the acid so introduced. Alternatively, we may dimension the acid proportions so as to maintain the temperature of the sulfuric acid at the reagitator or turbulencing means above the minimum tolerable temperature of the gases. The means for supplying acid are, according to the present invention, designed to supply acid at a rate of about 10% of the total processed sulfuric acid.

According to another feature of this invention, a mist collector separator is disposed in an upper portion of the settling chamber upstream of the outlet opening and between this opening and the second sump. The mist collector preferably consists of a wire-mesh filter along which the liquid phase is adapted to form a film intimately contacted by the gases. Thus the mist filter or collector constitutes a further absorption stage in which, without significant heat loss, further sulfur trioxide is abstracted from the gas phase by the liquid film.

According to yet another feature of this invention, the main mist collector described above is preceded by a preliminary mist collector disposed in a settling chamber and upstream of the primary mist collector. This preliminary mist collector preferably comprises a fluid-permeable support the upper surface of which is covered with packing bodies, e.g., Raschig rings, which provide additional thin-film contact and efficient separation of the liquid phase from the gas phase. As a consequence, the settling chamber may have a relatively small height.

According to the method aspects of the present invention, the upright venturi absorber is supplied with sulfuric acid at a concentration of 96 to 98% by weight at such a rate, with respect to the gas flow rate and sulfur trioxide concentration, that the sulfuric acid upon temination of absorption has a concentration of 98.5 to 99.3 percent by weight. 90 to 98 percent of the sulfur trioxide of the gas is removed at this stage. Sulfuric acid with a concentration of 97.5 to 98.5 percent by weight is injected into the reagitator or turbulencing passage in an amount up to 10 percent of the total sulfuric acid handled in the apparatus when it is desired to lower the temperature of the gases. The sulfuric acid introduced at this stage may be heated when a higher gas temperature is required.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
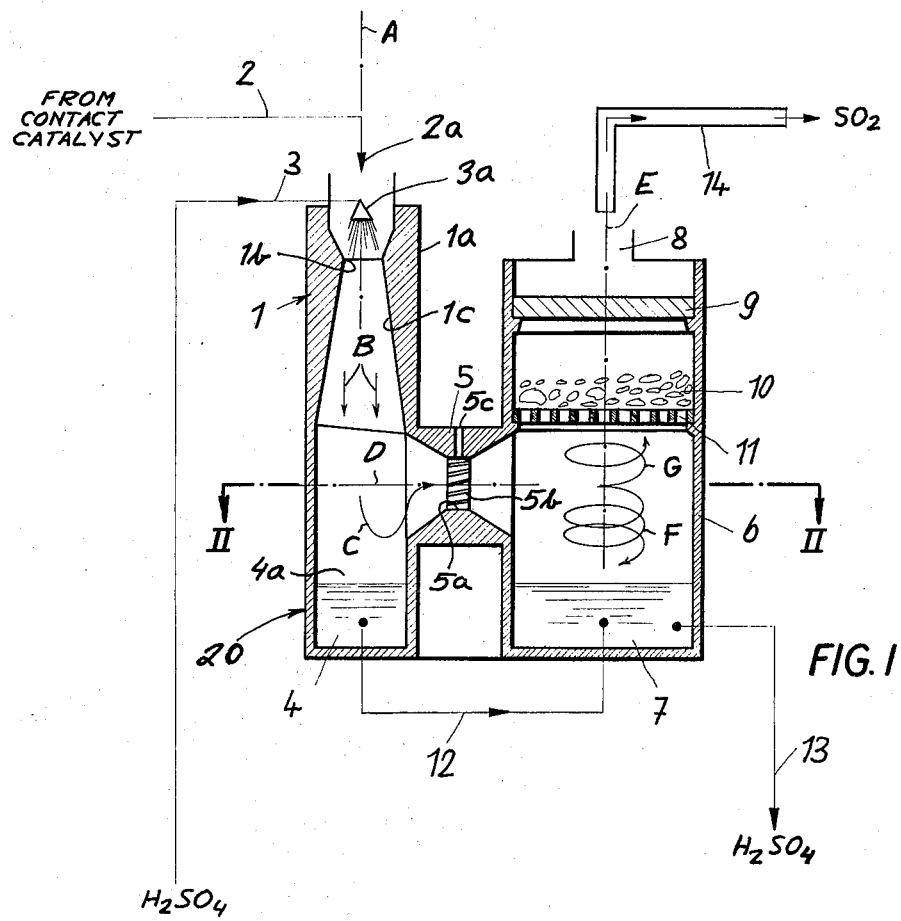
FIG. 1 is a vertical cross-sectional view, in diagrammatic form, through an interstage absorber according to the present invention.
Figure 2:
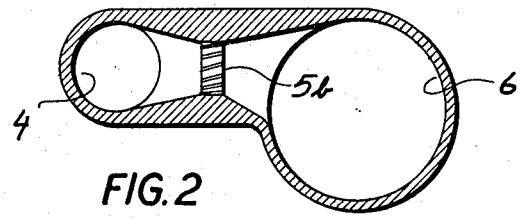
FIG. 2 is a section along line II – II of FIG. 1.

In the drawing, we have shown an interstage absorber for a sulfuric-acid plant for removal of sulfur trioxide from gases derived from a contact catalyst stage and prior to introducing these gases into the next contact catalyst stage. The interstage absorber comprises a housing 20 which is formed at one upper side with an upright venturi absorber 1 communicating with a gas-supply conduit represented diagrammatically at 2 and connected, in turn, with a previous contact catalyst stage. A duct 3 constitutes a supply conduit for introducing sulfuric acid into the venturi absorber. The venturi absorber 1 comprises a cylindrical housing portion 1a having a vertical axis A and a constriction 1b upstream of a progressively widening outlet 1c in which the venturi fluid expands. The inlet 2a and 3a in the gas-supply and acid-supply ducts 2 and 3 respectively are aligned along the axis A and are located somewhat upstream of the constriction 1b so that, as one fluid is forced downwardly through the constriction, the other fluid is entrained and admixed with it by a venturi principle.

Within the constriction, the gas/liquid velocity is increased sharply, thereby intimately dispersing the liquid in the gas and vice versa to bring about the contact between the finely divided liquid phase and the gas phase which removes $SO_3$ from the gas and strongly heats the liquid phase. In the diverging chamber 1c, the velocity falls and a portion of the droplets are collected in a sump 4 of sulfuric acid formed directly ahead of (below) the venturi absorber 1. Since some of the droplet particles travel with a relatively high momentum in the direction of arrow B and are not readily diverted or entrained by the gases in the direction of arrow C, these droplets impinge upon the liquid in the sump 4 so that the chamber 4a above the sump constitutes an impingement-type precipitator as well.

Located above the sump 4 but below the venturi absorber 1 and opening into the venturi half laterally and preferably along a tangent to the cylindrical chamber 6, is a reagitator or turbulencing region represented at 5. The turbulencing means 5 is shown to have a venturi passage 5a at which the velocity of the air/gas mixture is increased and can be provided with vanes 5b extending generally helicoidally so as to impart a swirl to the mixture about the horizontal axis O. The tangential arrangement of the passage 5, of course, ensures a swirl about the axis E of the settling chamber 6. Additional sulfuric acid can be introduced at this passage via an inlet 5c.

Downstream of the passage 5, there is provided the cylindrical settling chamber 6, the bottom of which forms a sump of sulfuric acid 7 while the upper portion has a central gas outlet opening 8 lying along the axis E mentioned earlier. The conduit 14, by which the gases are led from the outlet 8, is preferably jacketed to avoid loss of heat and all or part of the walls of the interstage absorber 20 may be thermally insulated for the same purpose. The conduit 14, of course, leads to the next contact catalysis stage.

In the upper portion of the settling chamber 6, we provide a primary mist collector or droplet trap 9 consisting of a wire-mesh filter dimensioned to catch entrained sulfuric acid droplets. The droplets coat the wire of the mesh and, in thin-film absorption, undergo sulfur-trioxide interchange with the gas phase to strip additional quantities of $SO_3$ from the gas. Below the trap 9, we provide a preliminary mist collector or liquid trap 10 in the form of a packing of acid-resistant rings carried by a perforated support 11. The sulfuric acid is withdrawn from the sump 7 by an outlet conduit 13 while sump 4 is connected to sump 7 by a line 12. In operation, a gas/liquid mixture is formed in the venturi absorber 1 and is accelerated so that the turbulent interaction of the gas and liquid brings about rapid heating of the small amount of sulfuric acid here used and a significant transfer of $SO_3$ into the sulfuric acid. As the gas/liquid mixture enters the expansion zone 1c and velocity is reduced, much of the sulfuric acid settles into the sump 4 while hot-momentum acid particles are captured by the sump 4 in accordance with impingement-separation principles. The balance of the gas/liquid mixture, in which the particles are small enough to be entrained with the gas, passes in the direction of arrow C into the venturi passage 5 in which the mixture is subjected to high turbulence and high velocity to promote further absorption of sulfur trioxide by the liquid phase. As the mixture expands into the settling chamber 6, the large liquid particles descend in a spiral fashion as represented by arrow F in accordance with cyclone-separation principles while the gases rise (arrow G) toward the outlet 8. Mist entrained with the gases is collected at 9 and 10 as previously described.

SPECIFIC EXAMPLE

The following Example is given for a system producing 100 metric tons of the monohydrate of sulfur trioxide per day by contact catalysis transformation of sulfur dioxide to sulfur trioxide. In the catalytic reaction ahead of the interstage absorber, 85 percent of $SO_2$ contained in the starting gas is converted to $SO_3$ and, at a rate of 10,650 m$^3$ per hour (STP) is supplied at a temperature of 180°C to the venturi absorber 1 via conduit 2. The sulfuric acid introduced at 3 into the venturi absorber has a concentration of 97.1 percent by weight and is at a temperature of 50°C, being delivered at a rate of 20.5 m$^3$ per hour. Gases entraining residual sulfuric acid are passed through the reagitator and the settling chamber 6 from which a large portion of the residual sulfuric acid is separated into the sump 7. At this point, 95 percent of the sulfur trioxide of the gas has been removed. The gas is then passed through the mist collector 10 into the mist trap 9 and is discharged via the heated conduit 14 (to prevent condensation) at a rate of 9,895 m$^3$ per hour (STP) at a temperature of 150°C for further contact catalysis. The sulfuric acid in sump 7, to which the sulfuric acid from sump 4 is delivered via conduit 12, has a concentration of 99 percent by weight and is at a temperature of 150°C.

We claim:

1. An interstage absorber for removing $SO_3$ from a gas mixture produced by the catalytic transformation of $SO_2$ into $SO_3$, comprising an upright, downwardly opening venturi absorber having a constriction, a diverging portion below said restriction and a parallel wall portion below and forming a junction with said diverging portion;

a gas supply conduit connected to said venturi absorber for feeding said gas mixture and an acid supply conduit for feeding sulfuric acid into an upper portion of said venturi absorber;

a sump disposed directly below said venturi absorber for collecting sulfuric acid discharged downwardly from an outlet of said venturi absorber at said junction above said sump for conducting gas with entrained residual sulfuric acid from said venturi absorber and accelerating and turbulencing same;

a horizontal venturi passage below said venturi absorber at the lower portion thereof connected to the venturi absorber outlet;

a settling chamber communicating with said venturi passage for settling residual sulfuric acid from the gas traversing said passage;

a mist collector disposed above the sulfuric acid in said chamber and above the region in which said passage communicates with said chamber for separating residual sulfuric acid from the gas;

an outlet formed above said mist collector for discharging a substantially sulfuric-acid free gas for further catalytic transformation;

a wire-type mist collector between said outlet above the first mist collector and said region;

a packing-type mist collector between said wire-type mist collector and said region; and swirl-inducing vanes spaced around said horizontal venturi passage for inducing a swirling movement in the fluid traversing same.

2. The interstage absorber defined in claim 1, further comprising means for introducing sulfuric acid into the gas traversing said passage.

3. The interstage absorber defined in claim 1 wherein said passage opens tangentially into said settling chamber, said settling chamber being cylindrical and its gas outlet disposed centrally at its upper end.

* * * * *